United States Patent [19]
Douglas et al.

[11] Patent Number: 5,469,528
[45] Date of Patent: Nov. 21, 1995

[54] NEURAL LOAD DISTURBANCE ANALYZER

[75] Inventors: Larry D. Douglas, Copper Canyon; Clarence W. Hutchinson, Jr., Arlington, both of Tex.

[73] Assignee: Syseca, Inc., Marina del Ray, Calif.

[21] Appl. No.: 945,528

[22] Filed: Sep. 16, 1992

[51] Int. Cl.$^6$ .............................. G06F 15/18; G06F 15/46
[52] U.S. Cl. ............................... 395/23; 395/21; 395/22; 395/24
[58] Field of Search .................................. 395/10, 20, 21, 395/22, 23, 24, 63, 64, 27, 25; 382/12–15

[56] References Cited

U.S. PATENT DOCUMENTS

| | | |
|---|---|---|
| 3,633,009 | 1/1972 | Green et al. . |
| 4,881,178 | 11/1989 | Holland et al. . |
| 5,048,100 | 9/1991 | Kuperstein . |
| 5,103,488 | 4/1992 | Gemello et al. . |
| 5,111,531 | 5/1992 | Grayson et al. . |
| 5,113,482 | 5/1992 | Lynne . |
| 5,121,467 | 6/1992 | Skeirik . |

OTHER PUBLICATIONS

10–page article entitled Error Adaptive Control Computer for Interconnected Power Systems by C. W. Ross from the Jul. 1966 IEEE Transactions On Power Apparatus And Systems (vol. Pas–85, No. 7).

8–page article entitled Dynamic Performance Evaluation Of A Computer Controlled Electric Power System by Charles W. Ross and Thomas A. Green (Leeds 7 Northrup Company, North Wales, Pa.).

11–page article entitled Experimentally Determined Properties of Exponentially Corelated Gaussian Noise by C. W. Ross et al. from the ISA Transactions, vol. 13, No. 2 of 1974.

Primary Examiner—David K. Moore
Assistant Examiner—Tariq Hafiz
Attorney, Agent, or Firm—Foley & Lardner

[57] ABSTRACT

A system and method for controlling the generation and distribution of power is disclosed. The system includes monitoring devices which acquire load data indicative of the system load. The load data are converted into patterns which are fed into a neural load analyzer configured to classify the patterns. The generators of the power system are controlled responsive to the resulting classifications.

7 Claims, 7 Drawing Sheets

NEURAL LOAD DISTURBANCE ANALYZER

FIELD OF THE INVENTION

The present invention relates to a power distribution system, and more particularly, to a control system which controls the generation of power responsive to power demand changes and rates of power demand changes.

BACKGROUND OF INVENTION

To efficiently operate a power transmission and/or distribution system, power must be dynamically distributed according to the changing power demands on the system. Efficient distribution is particularly difficult for those utilities servicing a significant component of large asynchronous loads that start up and shut down abruptly ("non-conforming loads").

To regulate the distribution of power, utilities typically employ automatic generation control systems ("AGCs") which control the distribution of power based on real-time monitoring of system frequency and interchange. When power demand cannot be met by the active generators at a particular utility, power is channeled from other, neighboring utilities. The exchange of power between utilities is called MW interchange.

To anticipate MW interchange, utility operators construct a set of MW interchange schedules based on the predicted needs of the various utilities servicing a region. However, actual MW interchange inevitably diverges from the scheduled levels. The extent to which actual MW interchange diverges from the scheduled MW interchange is typically monitored by each utility's AGC. Specifically, the operating area MW frequency, and the difference between the actual net MW interchange and the scheduled net MW interchange, are used to determine an Area Control Error ("ACE").

For example, ACE may be calculated according to Equation 1, where AI is the actual instantaneous operating area MW interchange, SI is the scheduled instantaneous operating area MW interchange, AF is the actual instantaneous operating area frequency, SF is the scheduled instantaneous operating area frequency, and FB is an operating area frequency bias parameter in MW/0.1 Hz.

$$ACE = (AI - SI) - 10FB(AF - SF) \quad (1)$$

An AGC could be configured to minimize or eliminate the Area Control Error by controlling the output of the generators of a utility in an attempt to exactly meet the power demands within the utility's area while providing any additional power for the scheduled MW interchange. However, the cost of chasing transient demand fluctuations is substantial. The waste caused by the pursuit of short-term demand fluctuations is further compounded when generators are activated or deactivated by operators in response to such fluctuations.

Thus, increasing the output levels of generators to meet an unanticipated load increase is only justified when the demand will be sustained for a significant period of time. Likewise, the output level of a generator should not be decreased in response to a drop in demand if it can be anticipated that the decrease in demand is only transient.

It is therefore desirable to recognize and distinguish between demand changes that will be sustained and those which will be transient. However, it is often difficult to distinguish between load disturbances indicative of sustained demand changes, load disturbances indicative of transient demand changes, and noise, such as transient power spikes. For example, noise can effectively mask significant non-zero centered load disturbances.

Filtering techniques may be employed to minimize noise, and thus make accurate disturbance classification more feasible. However, filtering tends to induce delays which adversely impact controller actions.

Attempts to automatically predict sustained demand changes based on load disturbance readings have only been moderately successful. For example, error adaptive control computers have been used to classify load disturbances using pre-specified classification functions, such as those disclosed in U.S. Pat. No. 3,633,009 issued to Green et al. While such methods can be tuned to detect one class of disturbances with accuracy, they do not perform optimally for other classes of disturbances. Further, such methods require prior knowledge of the statistical properties of the relevant processes, and are incapable of detecting new, unanticipated classes of disturbances.

As power transmission and/or distribution systems are likely to encounter load disturbances from a wide range of classes, many of which classes may not have been anticipated, it is clearly desirable to provide a power control system capable of quickly and accurately classifying disturbances belonging to a wide variety of classes, including unanticipated classes. It is further desirable to provide a power control system that automatically controls the output levels of generators in response to a signal indicative of the class of detected load disturbances.

SUMMARY OF THE INVENTION

The present invention provides for a power distribution system having means for monitoring a load and generating load data indicative of the load, and a neural load disturbance analyzer disposed to sample the load data, classify the sample, and generate a mode representative of the class of the sample. The system further includes means for controlling the generation of power in the system responsive to the mode indicated.

A method of controlling the generation of power in a power distribution system is also provided. The generation of power is controlled by monitoring a load, generating load data indicative of the load, and generating a pattern representative of the load data. The pattern is applied to the input slab of a trained neural network to produce a winning output, and a mode corresponding to the winning output is generated. One or more devices disposed to affect the generation of power in the system is controlled in response to the mode indicated.

A neural load disturbance analyzer is also provided. The analyzer has a pre-processor disposed to sample a signal indicative of a load and generate a pattern indicative of the sample. The analyzer also includes a trained neural network disposed to receive the pattern and determine a winning output indicative of the disturbance class of the load. A post-processor monitors the winning output and transmits a mode indication corresponding to the winning output.

The present invention further provides a method of training a self-organizing neural network to distinguish between patterns representative of load disturbances. The method of training includes the steps of sampling a signal indicative of load activity, generating a training set of patterns representative of the sampled load activity, and successively introducing the patterns of the training set into the input slab of the neural network. The neural network determines winning outputs based on the input patterns and the weights and biases of the connections of the neural network, and adjusts the weights and biases of the connections in response to the winning outputs.

Additionally, a trained neural network for classifying load disturbances is provided. The trained neural network is made by providing an untrained, self-organizing neural network. A signal indicative of load activity is sampled, and a training set of patterns representative of the sampled load activity is generated. The patterns of the training set are successively introduced into the input slab of the neural network, which determines winning outputs based on the input patterns and the weights and biases of the connections of the neural network. The weights and biases of the connections and adjusting in response to the winning outputs.

Also provided is a method of forcing a pre-determined distribution pattern on a self-organizing neural network. The method includes steps for selecting one or more neurodes of the output slab of the network, centering a geometric function on the selected neurodes, and assigning to each neurode of the network a constrainedly randomized connective weight and bias based on the distance of each neurode from the geometric function.

DETAILED DESCRIPTION OF THE INVENTION

Figure 1:
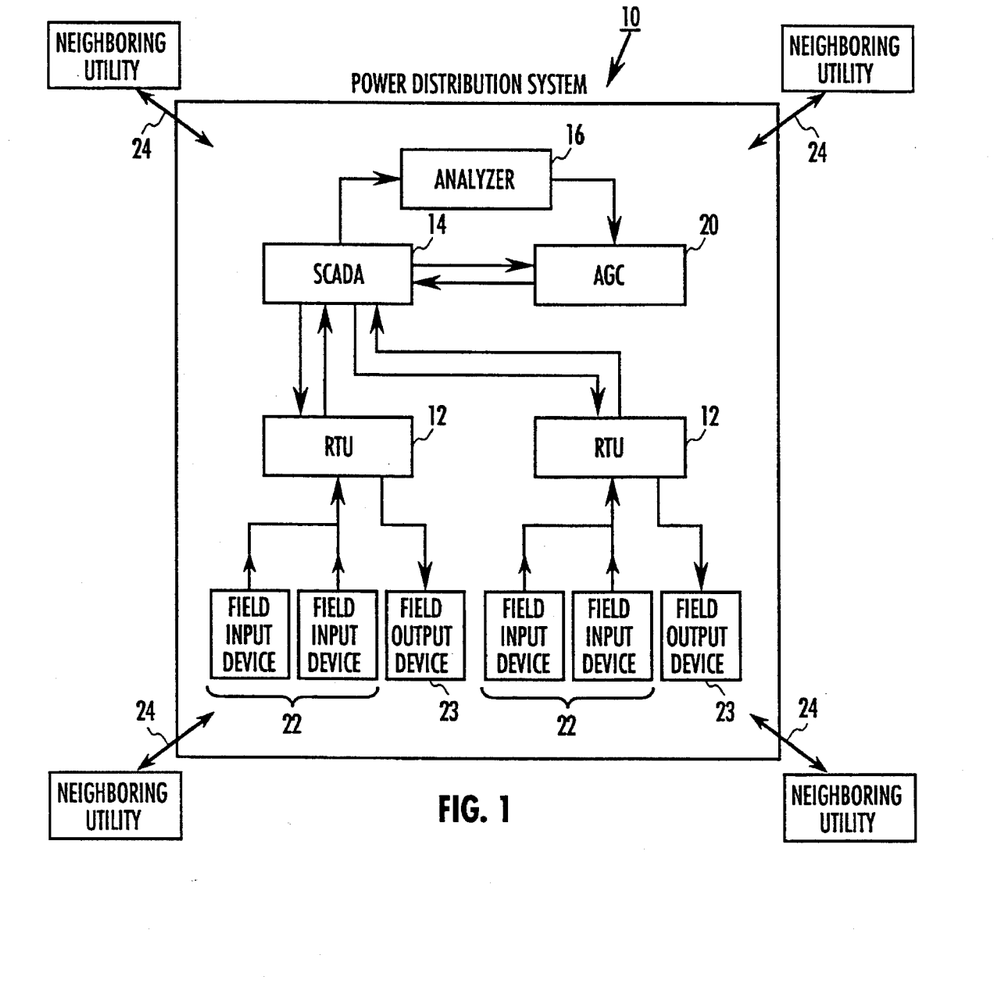
FIG. 1 is a block diagram of a power distribution system configured in accordance with an embodiment of the present invention.

Referring to FIG. 1, a power distribution system 10 for a utility control area is shown in accordance with one embodiment of the present invention. System 10 generally includes a plurality of remote terminal units ("RTUs") 12, a supervisory control and acquisition unit ("SCADA") 14, a neural load disturbance analyzer 16, and an automatic generation control unit ("AGC") 20. System 10 further includes a plurality of tie lines 24 which connect system 10 to the power distribution systems of neighboring utilities.

Remote terminal units 12 are a combination of hardware and firmware, and are used to collect raw field data via transducers which are connected to a plurality of field input devices 22. Remote terminal units 12 also control the operation of certain field output devices 23 based on signals received from AGC 20, as will be described in greater detail below.

Field devices 22 may be, for example, loads, switches, circuit breakers, generator outputs and generator limits. The raw field data generally includes data indicative of the current state of the system. More specifically, raw field data may include the breaker status, on/off AGC status, actual MW output, high MW limit, and low MW limit, for each generator in system 10, as well as the actual MW flow for each tie line 24, and the operating area frequency. Remote terminal units 12 package the raw field data, along with the RTUs' own up/down status and local/remote status, into a buffer for access by SCADA 14.

SCADA 14 periodically polls remote terminal units 12 to obtain the packaged data, analyzes the data for changes in state, issues alarms if predetermined conditions have occurred, and stores the data into a real-time database. Alarms can be issued responsive to both status and analog values. SCADA 14 also converts some fields of the raw data into values which correspond to meaningful units, such as megawatts or frequency, prior to storing the data.

Analyzer 16 accesses the real-time database of SCADA 14 to read the data therein indicative of the current system load. The load data read by analyzer 16 may be data indicative of the total system load, or a particular component of the load. In the preferred embodiment of the present invention, the load data read by analyzer 16 is indicative of the industrial load component of the current system load, as measured in megawatts. The industrial load component is particularly useful because it has been found to contain virtually all of the non-conforming loads. In contrast, the residential and commercial components of the system load are typically well behaved values.

Analyzer 16 includes a trained neural network, and is configured to read the load data from SCADA 14 and determine a mode indication, which corresponds to a classification of the load data. Analyzer 16 is designed to recognize load data patterns indicative of excursions, and to distinguish between long term excursions, short term excursions, and conforming loads through its mode indication.

By way of example, one embodiment of analyzer 16 may determine a mode indication from the set of modes shown and defined in Table 1, where $\sigma$ is the standard deviation of the system's load disturbances.

TABLE 1

| MODE | MEANING |
|---|---|
| 4 | transition away from positive sustained disturbance |
| 3 | $2\sigma$ sustained disturbance |
| 2 | $1\sigma$ sustained disturbance |
| 1 | transition towards a positive sustained disturbance |
| 0 | indeterminate |
| −1 | transition towards a negative sustained disturbance |
| −2 | $-1\sigma$ sustained disturbance |
| −3 | $-2\sigma$ sustained disturbance |

TABLE 1-continued

| MODE | MEANING |
|---|---|
| −4 | transition away from negative sustained disturbance |

The modes and respective disturbance classifications shown in Table 1 are merely exemplary. Disturbance classification schemes, including the number of modes, may vary from application to application. For example, a classification scheme may have only three modes: sustained positive, sustained negative, and indeterminate. Further, the disturbance classes associated with the modes may be based on predetermined hard threshold values, the spinning reserve of the system, or any other suitable characteristic of the system.

The method by which analyzer 16 classifies the load data to determine the appropriate mode indication will be discussed in greater detail below with reference to FIGS. 3A–5.

AGC 20 retrieves the mode indication from analyzer 16 and data indicative of the status of the system from the real-time database of SCADA 14, and controls the generation of power within system 10 in response thereto. Specifically, responsive to the retrieved information, AGC 20 transmits generation control signals to remote terminal units 12 through SCADA 14. Remote terminal units 12 control field output devices 23 based on the generation control signals. Thus, AGC 20 controls the output level of generators, and may further be configured to give indications of when an operator should activate or deactivate generators. AGC 20 also has the means for operator input of scheduled megawatt interchange and scheduled frequency.

The specific effect the mode indication has on the operation of AGC 20 will vary depending on the specifics of each application. For example, AGC 20 may be configured to switch the controller means of AGC 20 to emergency assist operation in response to certain mode indications. Alternatively, AGC 20 may be configured to force controller tracking in response to certain mode indications to prevent, for example, the chasing of false ACE deviations. In the presently preferred embodiment, described in detail below, AGC 20 is configured to compensate ACE signal calculations with values of estimated load disturbances based on the mode indications.

According to the presently preferred embodiment, AGC 20 determines a raw ACE signal based on the difference between the actual operating area frequency and the scheduled operating area frequency, and the difference between the actual net MW interchange and the scheduled net MW interchange. Then AGC 20 determines the integral of raw ACE ("IACE"), and the average value of raw ACE ("AVGACE") using the current plus the n−1 most recent previous values of raw ACE. AVGACE serves as a low frequency filter of ACE. However, the computation of AVGACE introduces a time lag. In order to overcome this lag, a compensation term ("COMP") is computed based on the mode indication from analyzer 16, a projected system MW load change, and the projected change in the net system MW interchange. The projected system MW load change is an estimate of the system MW load change during a predetermined time frame (e.g. in the next 3 minutes). This projection is estimated from the rate-of-change of the filtered system MW load. The projected change in the net system MW interchange is representative of the change in the net system MW interchange during a predetermined time frame, and is calculated from the entered interchange schedules.

Specifically, a temporary compensation term ("TCOMP") is initially calculated according to Equation 2, where $\Delta SI$ is the change in the MW interchange a predetermined number of minutes from now, $\Delta SL$ is the change in the projected system MW load a predetermined number of minutes from now, and $k_l$ and $k_s$ are predetermined constants between zero and one, inclusive.

$$TCOMP = k_l \Delta SL + k_s \Delta SI \qquad (2)$$

Then, COMP is determined based on the mode indication according to the rules shown in Table 2, where $k_d$ is a predetermined constant between 0 and 2, inclusive, and $k_t$ is a predetermined constant between 0 and 0.3, inclusive, and $\sigma$ is the standard deviation of the system load.

TABLE 2

| MODE | MODIFICATION |
|---|---|
| 0 | COMP = TCOMP + 0 |
| −2 or −3 | COMP = TCOMP − $k_d\sigma$<br>Signifies a 1σ or 2σ decrease in internal demand |
| 2 or 3 | COMP = TCOMP + $k_d\sigma$<br>Signifies a 1σ or 2σ increase in internal demand |
| 4 or −1 | COMP = TCOMP − $k_t\sigma$<br>Signifies a projected decrease in internal demand |
| 1 or −4 | COMP = TCOMP + $k_t\sigma$<br>Signifies a projected increase in internal demand |

The COMP calculations shown in Table 2 are merely exemplary and may vary from application to application. Likewise, the constants in Equations 2 and 3 and Table 2 are merely exemplary. In the preferred embodiment, these constants are user-configurable.

A positive COMP signifies a need for more generation, and therefore a need to decrease ACE. A negative COMP term signifies a need for less generation, and therefore a need to increase ACE.

AGC 20 then computes a processed ACE signal ("PACE") based on COMP and AVGACE according to Equation 3, where g is a predetermined constant greater than zero and less than or equal to 1.

$$PACE = AVGACE − g(COMP) \qquad (3)$$

AGC 20 then uses the PACE signal and the IACE to determine an efficient response to the current power demands. Based on this determination, AGC 20 transmits the generation control signals through SCADA 14 to remote terminal units 12, which, in turn, alter the states of field output devices 23 to bring about the desired response.

According to a preferred embodiment of the present invention, SCADA 14, AGC 20, and analyzer 16 are provided by a properly programmed computer system such as a JC-6000® computer system supplied by Johnson Yokogawa Corporation. However, SCADA 14, AGC 20, and analyzer 16 may alternatively be implemented on a variety of suitable hardware platforms, either as software or firmware, and may be implemented either digitally or through analog circuitry.

Figure 2A:
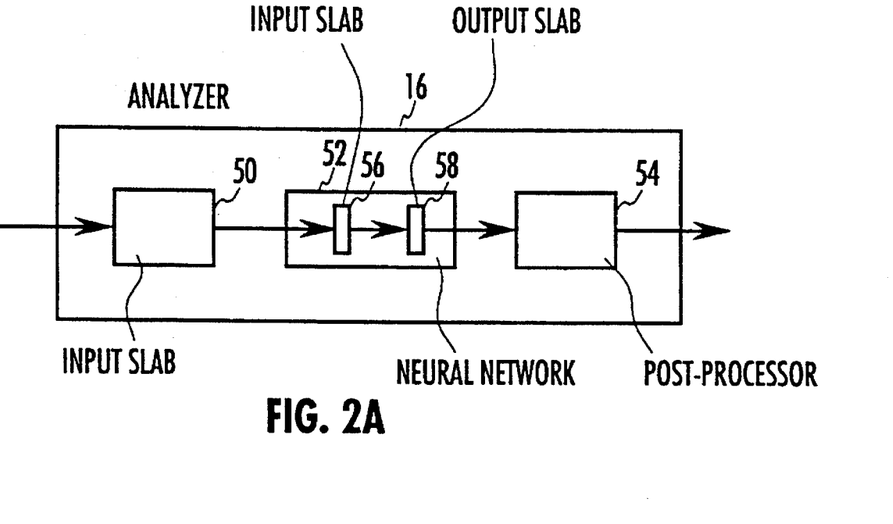
FIG. 2A is a block diagram of a neural load disturbance analyzer configured in accordance with an embodiment of the present invention.
Figure 2B:
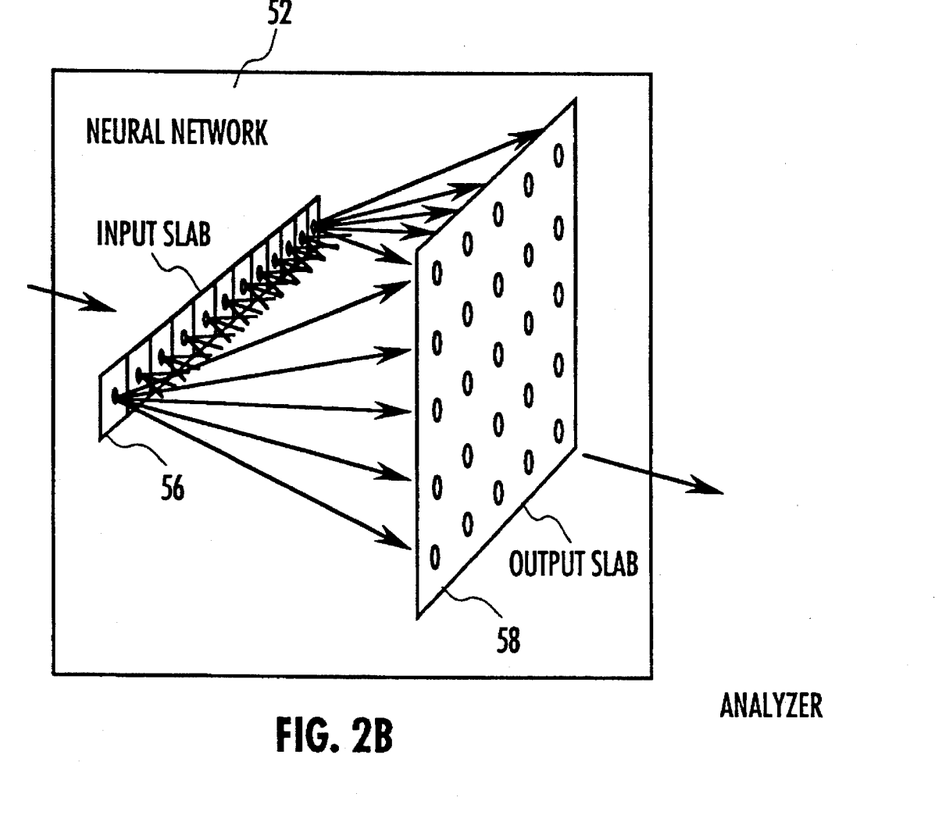
FIG. 2B is a conceptual view of a neural network configured in accordance with an embodiment of the present invention.

A preferred embodiment of analyzer 16 will now be described in detail with reference to FIGS. 2A and 2B. Analyzer 16 generally includes a pre-processor 50, a neural network 52, and a post-processor 54. Pre-processor 50 retrieves the load data from SCADA 14, generates patterns representative of the load, and presents these patterns to neural network 52.

Neural network 52 consists of two "slabs", 56 and 58, of neurodes. Slab 56 is the input layer of neural network 52 and contains twelve neurodes in a one-dimensional array. The patterns generated by pre-processor 50 are presented at slab 56. Slab 58 is the output slab and contains twenty five neurodes in a two-dimensional array. Each input neurode is connected to every output neurode through weighted and biased connections. During real-time operation, the weights and biases of the neurode connections are fixed at values determined during a training process which will be described below in reference to FIGS. 4A–4B. Neural network 52 identifies a winning output neurode based on the input pattern set and activates post-processor 54. The particular neurode of slab 58 that is most excited by a given pattern is the "winning output" for that pattern.

Post-processor 54 receives the winning output from neural network 52 and transmits a mode indication to AGC 20, which is used by AGC 20 to generate the PACE signal, as described above. A more detailed description of the real-time operation of analyzer 16 will now be given with reference to FIGS. 3A–3C.

Figure 3A:
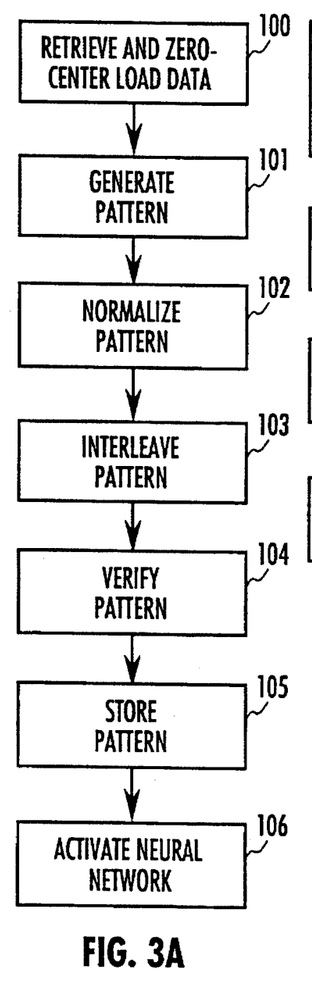
FIG. 3A is a flow chart showing the real-time operation of a pre-processor configured in accordance with an embodiment of the present invention.

FIG. 3A shows a flow diagram of the operation of pre-processor 50 during normal, real-time operation. Pre-processor 50 generally executes the steps of retrieving and zero-centering the load data 100, generating a pattern 101, normalizing the pattern 102, interleaving the pattern 103, verifying the pattern 104, storing the pattern 105, and activating neural network 52 for real-time analysis 106.

In step 100, pre-processor 50 retrieves the load data that was monitored during a predetermined time period ("time window") into a load data array and "zero-centers" the load data array. The size and overlap of time windows are user-configurable. The load data array is zero-centered by subtracting a value indicative of the running average of the past load data arrays from the elements of the current load data array. For example, the load data array may be zero-centered by computing the running average of the 15 most recent load data arrays and subtracting this running average from the elements of the current load data array.

In step 101, an input pattern is generated. In the presently preferred embodiment, the input pattern is a one-dimensional array of values. The pattern includes values representative of a plurality of load data arrays, including the current load data array. More specifically, a value is generated for the current load data array by, for example, counting the number of values within the load data array that exceed a predetermined threshold value. For example, if five of ten values within a load data array exceed a predetermined threshold value, then the load data array may be represented by the single value 0.5. This value is combined with other values representative of previous load arrays to form an input pattern. A pattern is constructed by appending the pattern in one time window with those in other time windows. The user can specify the various parameters used in the construction of the input patterns, such as the number of time windows (usually two) per pattern, the size of each time window, the window time step, and the allowed overlap with the previous time window.

In step 102, the pattern is normalized by scaling all values therein to values between 0 and 1. In step 103 the pattern is interleaved. Interleave refers to the process of applying an order to the values within the input pattern before presenting the pattern to the network. By altering the order of input pattern values, a user can alter the relative significance of each component of the pattern. It has been observed that those elements presented at the extremes of an input slab have a greater affect on the network output than those values introduced closer to the center of the slab. The input pattern interleave may therefore be customized based upon the specific needs of an application. For example, in some applications, such as radio frequency meteor scatter propagation, a loss of noise disturbances could be an event worth detecting. In such a scenario, one would order detector values differently than one would if trying to emphasize the arrival of a disturbance.

In the presently preferred embodiment of the invention, the twelve values of an input pattern are ordered as will now be described. The first three values are representative of disturbances of magnitudes $+3\sigma$, $+2\sigma$, and $+1\sigma$, respectively, for the current time window. The next three values are representative of disturbances of magnitudes $+3\sigma$, $+2\sigma$, and $+1\sigma$, respectively, for the previous time window. The next six values mirror the first six, but are for negative disturbances ($-1\sigma$, $-2\sigma$, $-3\sigma$, for the previous time window, and $-1\sigma$, $-2\sigma$, $-3\sigma$, for the present time window). Thus ordered, the input pattern interleave separates negative and positive disturbance input values (left and right), current and previous disturbance input values (outside and inside), and large and smaller disturbance values (outside to inside), to provide an interleave for efficient disturbance recognition.

In step 104, the pattern is verified. Specifically, the pattern is checked to determine if it meets the input value constraints of network 52. For example, a pattern consisting exclusively of zero values is not permitted.

In step 105, the pattern is stored for later access by neural network 52. In step 106, neural network 52 is activated for real-time analysis.

Figure 3B:
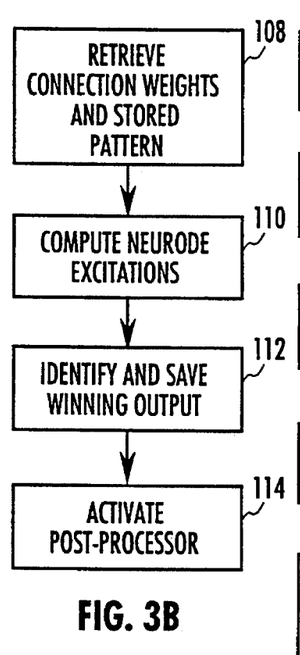
FIG. 3B is a flow chart showing the real-time operation of a neural network configured in accordance with an embodiment of the present invention.

FIG. 3B shows a flow diagram of the real-time operation of neural network 52. During normal, real-time operation, neural network 52 generally executes the steps of retrieving connection weights and biases and the stored pattern 108, computing neurode excitations 110, identifying and saving the winning output 112, and activating post-processor 54 for real-time analysis 114.

In step 108, neural network 52 retrieves the neurode connection weights and biases which were determined during a previous training process, which will be described in detail below, and the current pattern, which was stored in step 105. This pattern is fed into input slab 56. In step 110, the neurodes of output slab 58 are excited based on the input pattern and the neurode connection weights and biases. In step 112, the winning output is identified for the current input pattern and stored in a storage device. In step 114, post-processor 54 is activated for real-time analysis.

Figure 3C:
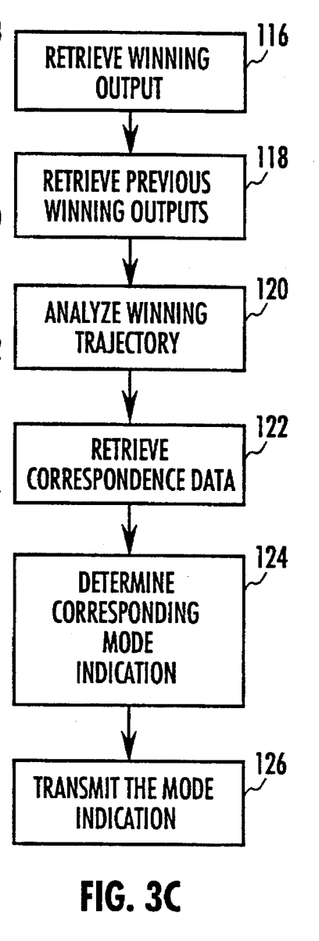
FIG. 3C flow chart showing the real-time operation of a post-processor configured in accordance with an embodiment of the present invention.

FIG. 3C shows a flow diagram of the real-time operation of post-processor 54. During normal, real-time operation, post-processor 54 generally executes the steps of retrieving the winning output 116, retrieving previous winning outputs 118, analyzing the winner trajectory 120, retrieving correspondence data 122, determining the mode indication which corresponds to the winning output 124, and transmitting the analysis output 126 to AGC 20.

Specifically, in step 116, post-processor 54 retrieves the winning output that was stored in step 112. In step 118, post-processor 54 retrieves a predetermined number of previously stored winning outputs. In step 120, the current winning output is analyzed in light of the past winning outputs. In particular, post-processor 54 determines the current direction of migration, or trend, of the most recently detected disturbances, based on the past winning outputs. If the current winning output is inconsistent with the trend, then it may indicate a large noise spike rather than a sustained disturbance, and therefore should not result in a mode indication indicative of sustained disturbance. For example, if there has been a definite shift toward a strong positive disturbance, a winning output indicative of a negative direction jog would be suspect. Through this trend comparison, post-processor 54 verifies that some meaningful, sustained disturbance is present.

Once a winning output has been verified for consistency with the current trend, the mode indication which corresponds to the winning output is determined. In one embodiment, the mode indications may range from 4 to −4, as described above with reference to Table 2.

Specifically, in step 122, correspondence data, which is data indicative of the mapping or correspondence between winning outputs and the mode indications, is retrieved from storage. This data has been previously created during a verification process which will be described below with reference to FIG. 5. In step 124, the mode indication for the current winning output is determined based upon the correspondence data. The mode indication is thus available for retrieval by AGC 20, as was described above. In step 126, the mode indication is transmitted to AGC 20.

Neural network 52 may be any type of neural network trained to perform the described steps. However, a self-organizing network architecture is preferred, since the training of other types of networks, such as back-propagation networks, generally requires that the training patterns be pre-classified. The process of pre-classifying patterns may be difficult, since the correct classification of disturbance patterns may not be readily ascertainable. During training of a back-propagation network, each pattern is presented to the network along with the pattern's predetermined correct classification. The network then adjusts its weights and biases according to a learning function until the input of the given pattern results in the output of the given classification.

According to the preferred embodiment of the invention, neural network 52 is a self-organizing neural network. Thus, neural network 52 does not require special training information to arrive at a conclusion, as would be necessary in a back-propagation network. However, while the winning outputs of a self-organizing neural network will distinguish between dissimilar input patterns, the specific mapping between winning outputs and input pattern classes is typically not determined until after training. This shortcoming may be avoided by organizing the initial weights and biases of the network prior to training. The process of pre-training a self-organizing network to force a desired outcome distribution pattern will be discussed in greater detail below with reference to FIGS. 6 and 7.

If no pre-training distribution forcing is performed, then a verification procedure must be executed following the initial training to determine the specific mapping between winning outputs and input pattern classifications.

Figure 4A:
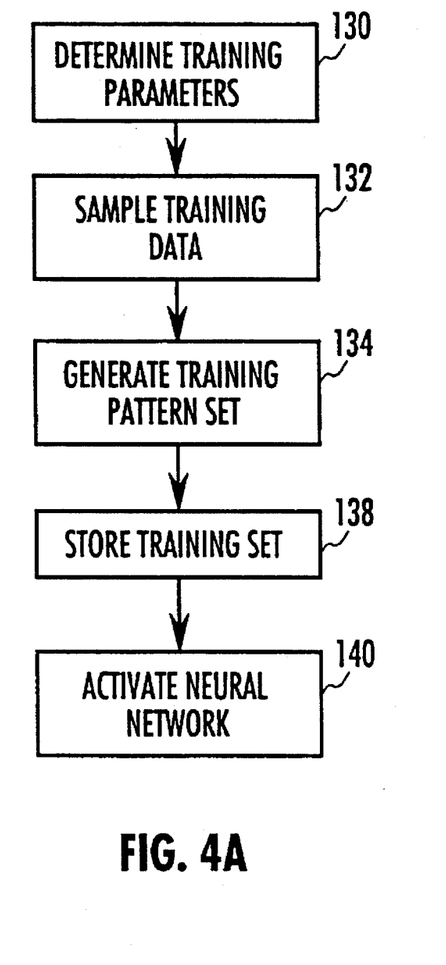
FIG. 4A is a flow chart showing the training-mode operation of a pre-processor configured in accordance with an embodiment of the present invention.
Figure 4B:
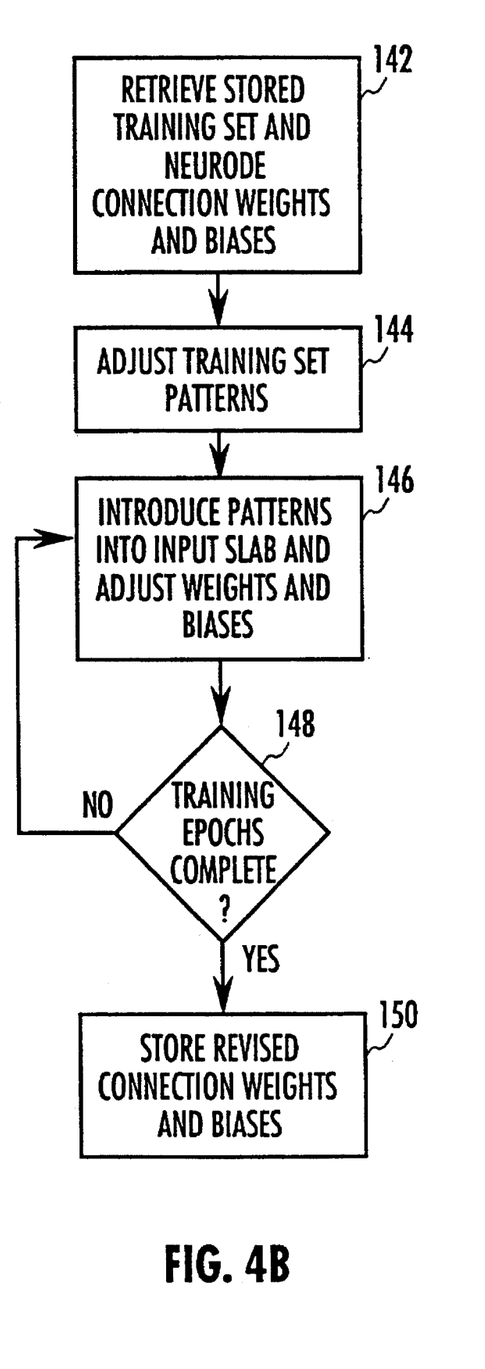
FIG. 4B is a flow chart showing the training-mode operation of a neural network configured in accordance with an embodiment of the present invention.

The process by which neural network 52 is trained will now be described in detail with reference to FIGS. 4A–4B. In general, pre-processor 50 prepares a set of training patterns in steps 130 to 140, and, in steps 142 to 150, neural network 52 adjusts the weights and biases of the connections between its neurons to distinguish between the dissimilar patterns of the training set.

In step 130, pre-processor 50 determines training parameters for the training session. Training parameters include load deviation parameters, the number of windows per pattern, window size, window time step, and overlap between windows. Load deviation parameters are the value ranges (e.g. +3σ, +2σ, +1σ, indeterminate, transitional, −1σ, −2σ, and −3σ) used to classify load disturbances.

To determine the load deviation parameters, pre-processor 50 reads the values of data representative of load activity (the "training data") prior to training to determine the actual deviation of the values therein. Training data may be, for example, load data that was stored during the real-time monitoring of the system load. As load dynamics change over time due to numerous external factors, pre-processing runs to determine actual deviation may be performed periodically to ensure that accurate deviation values are maintained.

Alternatively, load classification ranges may be entered directly by a human operator. For example, a user may change the operative load deviation parameters to +4σ, +3σ, +2σ, transitional, −2σ, −3σ, and −4σ. A user may also directly specify hard limits, such as specific megawatt levels, for disturbance values, rather than use limits dependent on load deviation.

In step 132, pre-processor 50 samples the training data. In step 134, input patterns are generated from the data sampled in step 132. These patterns are generated in a manner similar to that described above with reference to steps 100 to 104, and are collectively referred to as the training pattern set. In the case of training, step 104 may optionally include a check for pattern redundancy. Specifically, in addition to range-verification, pre-processor 50 may compare each pattern in the training pattern set to the patterns which precede it. If it is identical or similar to a pattern which precedes it, it may be discarded from the training pattern set. The parameters which define "similarity" are entered by a user. Similar patterns may be eliminated without significantly affecting the training outcome since similar patterns have similar training effects.

Finally, the training pattern set is stored in step 138, and pre-processor 50 activates neural network 52 in training mode in step 140.

In step 142, neural network 52 retrieves the stored training pattern set and the neurode connection weights and biases. If pre-training distribution forcing is not used, all connection weights and biases are initially randomized. In step 144, the patterns of the training set are adjusted. Adjustments may include scaling, clamping, or otherwise modifying the patterns to make them more suitable to the particular network. Adjustments may also include discarding those patterns from the training set which are superfluous or otherwise undesirable. For example, the training set may be adjusted by discarding those patterns representative of time periods in which few load disturbances occurred. In step 146, neural network 52 is trained with the patterns of the training set.

Specifically, when training starts, the first pattern of the training set is presented at input slab 56 of neural network 52. The introduction of the pattern excites the neurodes of output slab 58 based on the connection weights and biases. Neural network 52 senses the most excited (largest valued) neurode in output slab 58 and begins to inhibit sensitivity of output slab 58 outside of the immediate neighborhood of that neurode. In this way, the activation of neurodes on output slab 58 becomes related to the uniqueness of the input pattern. Initially, the training set is lumped into the four corners of output slab 58. As training continues, the "winning" or most activated nodes are gradually pushed apart on the basis of uniqueness. The sequential introduction of the entire pattern set is one training "epoch". Training generally consists of multiple epochs. In one embodiment of the invention, initial training is deemed to be complete at seventy-five epochs.

Patterns representative of non-conforming load disturbances are unique, therefore they tend to get separated in output slab 58. Generally, the winning outputs of patterns representative of positive disturbances migrate to one side of output slab 58, and the winning outputs of patterns representative of negative disturbances migrate to the other. Eventually one neurode of output slab 58 will be the strong positive disturbance indication and another will represent the strong negative disturbances. Neurodes in the vicinity of these key neurodes will indicate disturbances of lesser magnitude or transitions to or away from the maximum disturbance.

In step 148, it is determined whether the desired number of training epochs have been completed. If not, step 146 is repeated. Otherwise, control passes to step 150. At step 150, the revised connection weights and biases are stored.

As mentioned above, prior to training, a process may be performed on a self-organizing neural network to force a desired output distribution. The process of forcing a distribution pattern on a self-training neural network will now be described with reference to FIGS. 6 and 7.

Figure 6:
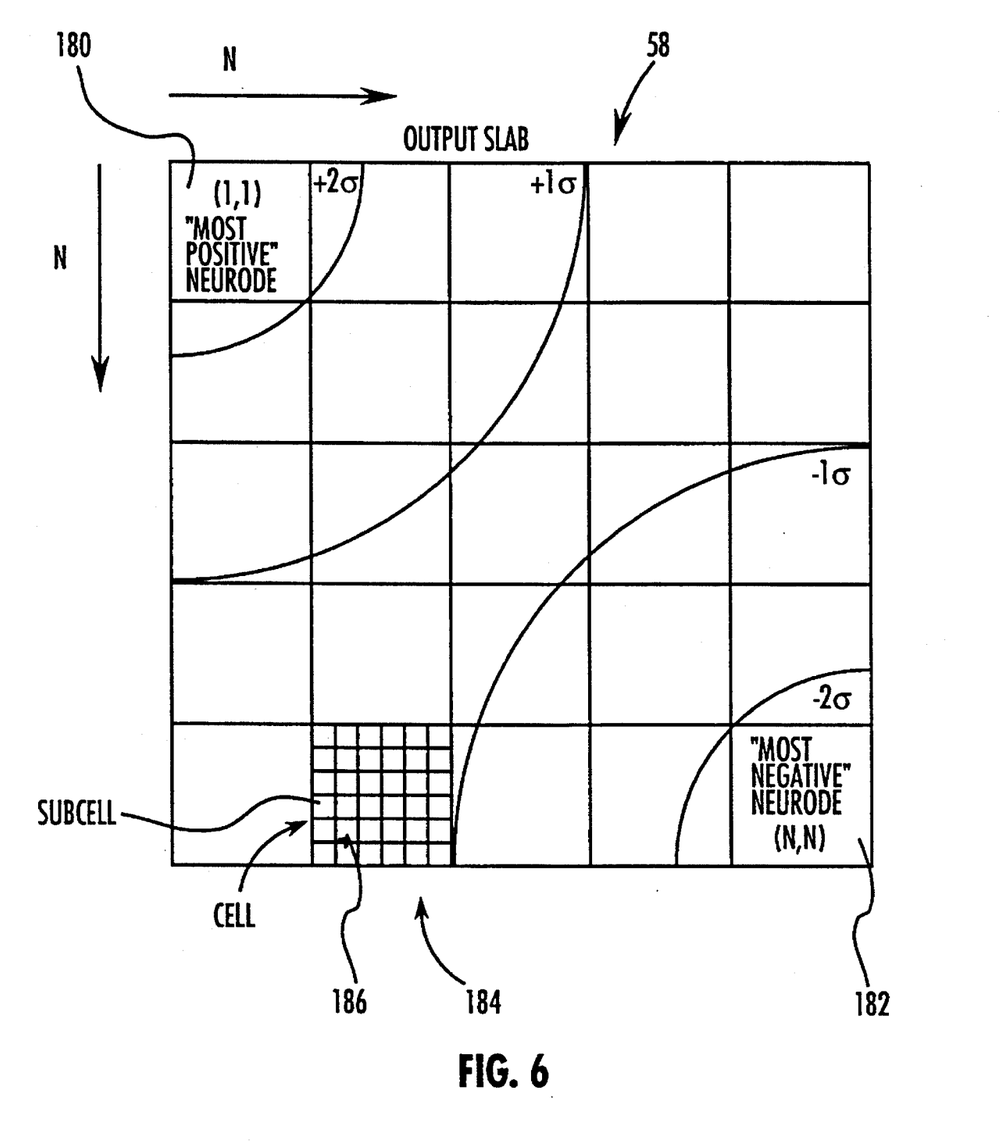
FIGS. 6 and 7 are diagrams of a neural network output slab having a forced winning output distribution pattern.
Figure 7:
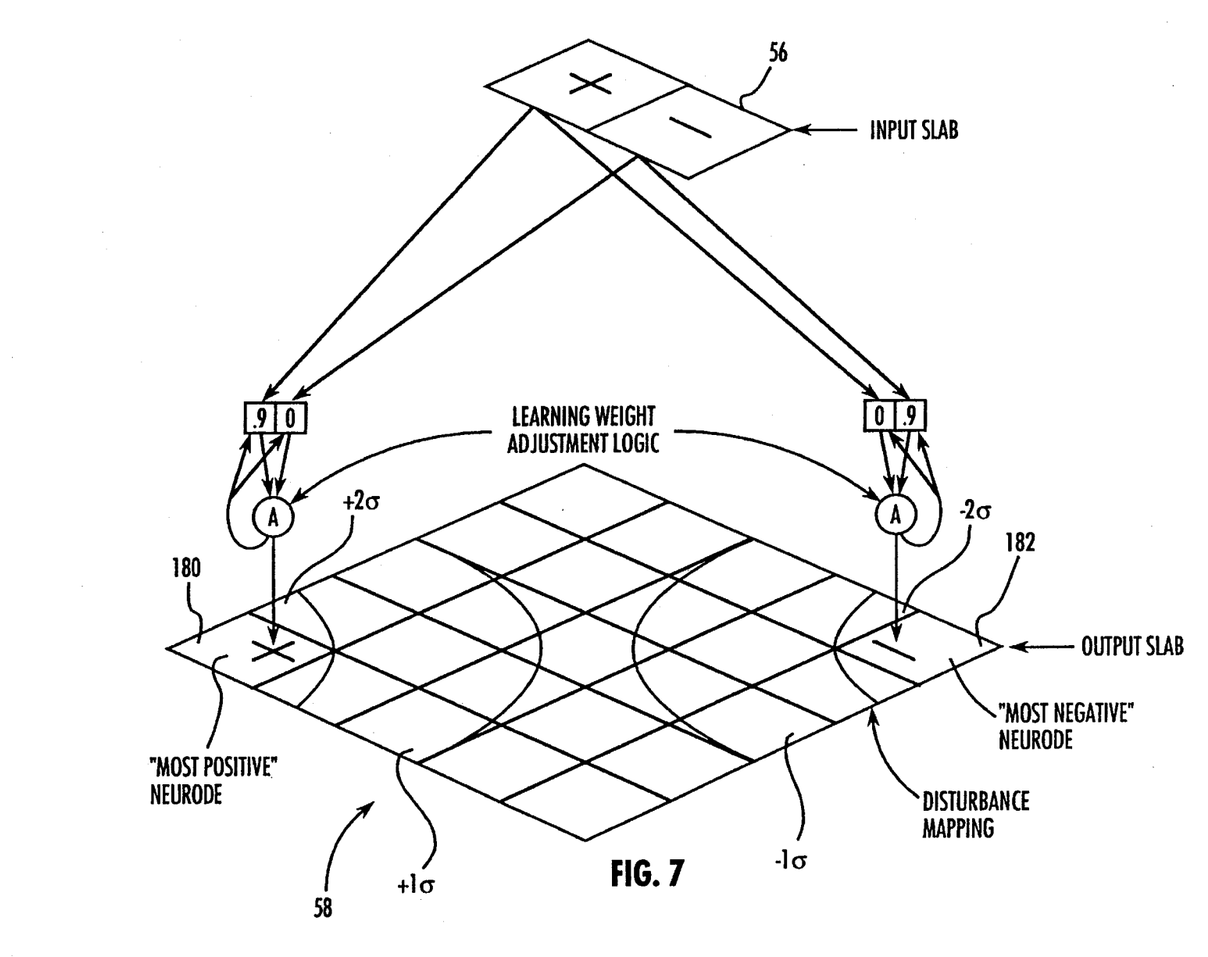

An N×N output slab 178 comprises a N×N array of cells. Prior to training, pre-processor 50 extracts the topology of output slab 178, and centers multiple geometric functions on the desired "most positive" and "most negative" neurodes. According to the presently preferred embodiment of the invention, the desired "most positive" and "most negative" neurodes are respectively apexes 180 and 182 (cell 1,1 and cell N,N). In the presently preferred embodiment, ellipsoid functions are centered on apexes 180 and 182, although paraboloids, cones, and other geometric functions may also be used. Each cell of output slab 178 is then sub-divided into a plurality of subcells. One of the subcells 186 of each cell 184 is randomly chosen, and an initial weight is assigned each cell based on the distance of the selected subcell to the selected geometric function. Thus, the initial connection weights retain a random character, but through constraining the range of each cell's random weight, a predetermined desired output pattern is forced. Weights associated with the positive side of the input slab are assigned on the basis of the geometric function centered on apex 180. Similarly, weights associated with the negative side of the input slab are assigned on the basis of the geometric function centered on apex 182. Specifically, by generating initial connection weights as described, training patterns representative of positive disturbances will migrate closer to apex 180 and training patterns representative of negative disturbances will migrate toward apex 182.

While this method of forcing a predetermined output pattern on a self-organizing neural network has been described with reference to a network having an N×N output slab, the method's application is not limited to self-organizing neural networks having any particular output slab size or configuration. For example, it can be employed to force the output distribution pattern of self-organizing neural networks having hexagonal or rectangular output slabs, as well as those having N×N square output slabs.

After training is completed, neural network 52 will distinguish between input patterns, and, in particular, will distinguish between patterns representative of normal loads, patterns representative of positive sustained disturbances, and patterns representative of negative sustained disturbances. These distinctions are made by separating, in slab 58, the location of the winning outputs of each pattern type.

However, unless a desired distribution has been forced prior to training, as described above, the correspondence between the input pattern types and the location of the winning outputs caused by the introduction of each pattern type is initially unknown. This correspondence may be determined, or if known, may be verified, through a post-training verification process.

Figure 5:
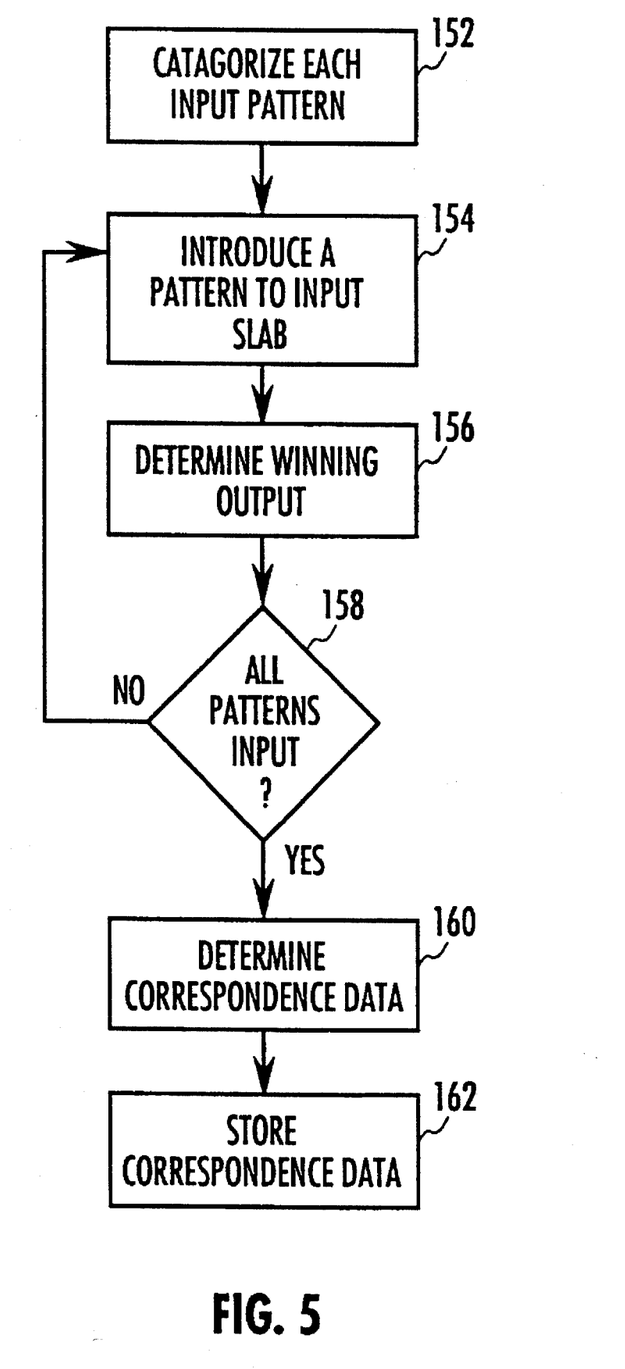
FIG. 5 is a flow chart showing a verification process in accordance with an embodiment of the present invention.

Referring to FIG. 5, verification generally includes the steps of categorizing the patterns of a set of patterns 152, introducing into neural network 52 the patterns of the classified set 154, and observing which output neurode "wins" for each pattern 156.

Specifically, in step 152 each pattern of a pattern set is placed into one of a predetermined number of classes. According to one embodiment of the present invention, the classes are (1) patterns indicative of a load disturbance of less than −60 MW, (2) patterns indicative of a load disturbance between −60 and −30 MW, (3) patterns indicative of a load disturbance between −30 and 30 MW, (4) patterns indicative of a load disturbance between 30 and 60 MW, and (5) patterns indicative of a load disturbance greater than 60 MW. These classes roughly correspond to the $-2\sigma$, $-\sigma$, 0, $+\sigma$, and $+2\sigma$ classification described above. The specific class boundaries, as well as the number of classes, may be suitably adjusted by a user.

In step 154, a pattern from the classified pattern set is input to neural network 52 and, in step 156, the winning neurode of each pattern is determined. In step 158, it is determined whether all patterns of the characterized pattern set have been input. If they have not, control passes back to step 154. Otherwise, control passes to step 160. In step 160, the correspondence data is determined. The correspondence data is representative of the relationship or mapping between the predetermined classes and the winning outputs of patterns falling within the classes. Once strong negative and strong positive disturbance outputs have been determined, the entire pattern set can be readily verified. Thus, a correspondence can be determined between each of the predetermined classes and the output neurodes of slab 58. In step 162, the correspondence data is stored.

The number of "hits" on the individual output neurodes during a training epoch constitutes a probability density distribution. The probability of a given pattern occurring can therefore be determined by dividing the number of times the winning output of the pattern wins during the training epoch by the number of patterns in the training set.

Once neural network 52 has been trained and the correspondence between the winning outputs and the predetermined classes has been determined, analyzer 16 may be used for real-time load data analysis as described above. The more patterns used to determine the connection weights and biases of neural network 52, the more accurately neural network 52 is able to classify load patterns. Thus, it is desirable to calibrate neural network 52 periodically after the initial training. Calibration is accomplished through the same process as the initial training, as described above, except that the interpretation of the winning outputs will be known in advance. The training patterns used during calibration will typically be generated from the load data monitored since the last calibration or training. If a calibration session introduces a significant amount of novel patterns, the connection weights and biases of neural network 52 may be extensively revised. Such extensive connection weight revision may alter the correspondence between the winning outputs and the predetermined classes. Thus, after each calibration, the user is allowed to modify the correspondence data.

While particular embodiments of the present invention have been shown and described, modifications may be made. Specifically, the components of system 10 may be implemented on a variety of suitable hardware platforms. For example, analyzer 16 may be implemented on a personal computer and linked to SCADA 14 and AGC 20 via a suitable network connector, such as a DECnet™ link. DECnet™ network connectors are generally available from Digital Equipment Corporation. Further, a variety of suitable load sensing techniques may be employed to generate the load data. Likewise, neural network 52 may be any of a number of suitable neural networks. Such networks may vary, for example, by number of inputs, number of outputs, number of network layers, activation methods, weight adjustment means, and learning adjustment means. Various other substitutions, modifications, changes and omissions may be made in the design and arrangement of the elements without departing from the spirit of the invention as expressed in the appended claims.

What is claimed is:

1. A neural load disturbance analyzer for classifying a utility, power load disturbance into one of a plurality of disturbance modes, the neural load disturbance analyzer comprising:

a pre-processor which samples a signal indicative of a utility, power load at a plurality of times, the pre-processor generating pattern data representative of a pattern indicative of the samples;

a trained neural network disposed to receive the pattern and determine a winning output representative of the utility, power load disturbance;

a post-processor disposed to monitor the winning output and select a disturbance mode representative of the utility, power load disturbance based on the winning output; and means for determining the probability of a utility, power load disturbance based on the number of occurrences of the winning output in the pattern data during a predetermined period relative to the total number of patterns presented to the neural network during the predetermined period.

2. The neural load disturbance analyzer of claim 1 wherein the pre-processor comprises:

means for generating a zero centered pattern data representative of the sample;

means for normalizing the zero centered pattern data; and means for activating the trained neural network.

3. The neural load disturbance analyzer of claim 2 wherein the sample is representative of the load during a current time window, and wherein the means for generating a zero centered pattern representative of the sample comprises:

means for combining the sample with a sample representative of the load during a previous time window; and means for ordering the combined samples according to a predetermined criteria.

4. The neural load disturbance analyzer of claim 1 wherein the neural network is self-organizing and comprises:

a plurality of neurodes connected by a set of connection weights and biases;

means for determining excitations of the neurodes based on the pattern data which is applied to the neural network and the set of connection weights and biases;

means for identifying a winning output based on the neurode excitations; and means for activating the post-processor.

5. A method of training a self-organizing neural network having connections with weights and biases to distinguish between patterns representative of utility, power load disturbances, the method comprising the steps of:

retrieving data indicative of utility, power load disturbances at a plurality of times;

generating a set of pattern data groups representative of the utility, power load disturbances;

successively applying each pattern data group to an input slab of the self-organizing neural network, determining winning outputs based on the pattern data group and the weights and biases of the connections of the self-organizing neural network, and adjusting the weights and biases of the connections to segregate the utility, power load and determine responsive actions;

determining the number of times the winning output of a pattern wins during a training epoch; and determining the probability of the occurrence of a disturbance corresponding to the winning output of the pattern by dividing the number of times the output wins during a training epoch by the number of pattern data groups.

6. The method of training a self-organizing neural network of claim 5 further comprising, prior to performing the step of successively applying the pattern data groups to the input slab of the neural network, the steps of:

normalizing the pattern data groups upon initialization; and randomizing the connection weights and biases of the neural network.

7. The method of training a self-organizing neural network of claim 6 further comprising the steps of:

repeating the step of successively applying the pattern data groups to the input slab; and storing the connection weights and biases of the neural network after the pattern data groups have been applied to the input slab.

* * * * *